United States Patent [19]

Spary

[11] 3,868,551

[45] Feb. 25, 1975

[54] POLYPHASE CIRCUIT CONTROL SYSTEM

[75] Inventor: Wilburn W. Spary, Pond Creek, Okla.

[73] Assignees: Thomas L. Bryan; Robert E. Bryan, both of Oklahoma City, Okla. ; part interest to each

[22] Filed: Mar. 25, 1974

[21] Appl. No.: 454,634

[52] U.S. Cl. .................. 317/23, 317/27 R, 317/31, 317/135 R, 317/36 TD, 317/141 R
[51] Int. Cl. .......................................... H01h 47/18
[58] Field of Search ......... 317/23, 27 R, 31, 46, 47, 317/135 R, 36 TD, 141 R

[56] References Cited
UNITED STATES PATENTS

| | | | |
|---|---|---|---|
| 3,160,786 | 12/1964 | Faglie | 317/27 R |
| 3,495,130 | 2/1970 | Bruner et al. | 317/31 |
| 3,633,072 | 1/1972 | Duncan | 317/27 R |

*Primary Examiner*—James D. Trammell
*Attorney, Agent, or Firm*—Robert K. Rhea

[57] ABSTRACT

A polyphase current fault detection circuit, interposed between a polyphase current supply and a polyphase current distribution system, includes a plurality of energized electromagnets respectively connected to respective phases of the polyphase current supply. First and second slave electromagnets, respectively connected with a lockout coil and reset coil acting on polyphase circuit breaking and making ganged switch elements are successively energized by a phase interruption to any one of the energized electromagnets to open the circuit breaking switch elements and automatically reclose the circuit breaking switch elements when all phases of the polyphase source have been restored.

5 Claims, 1 Drawing Figure

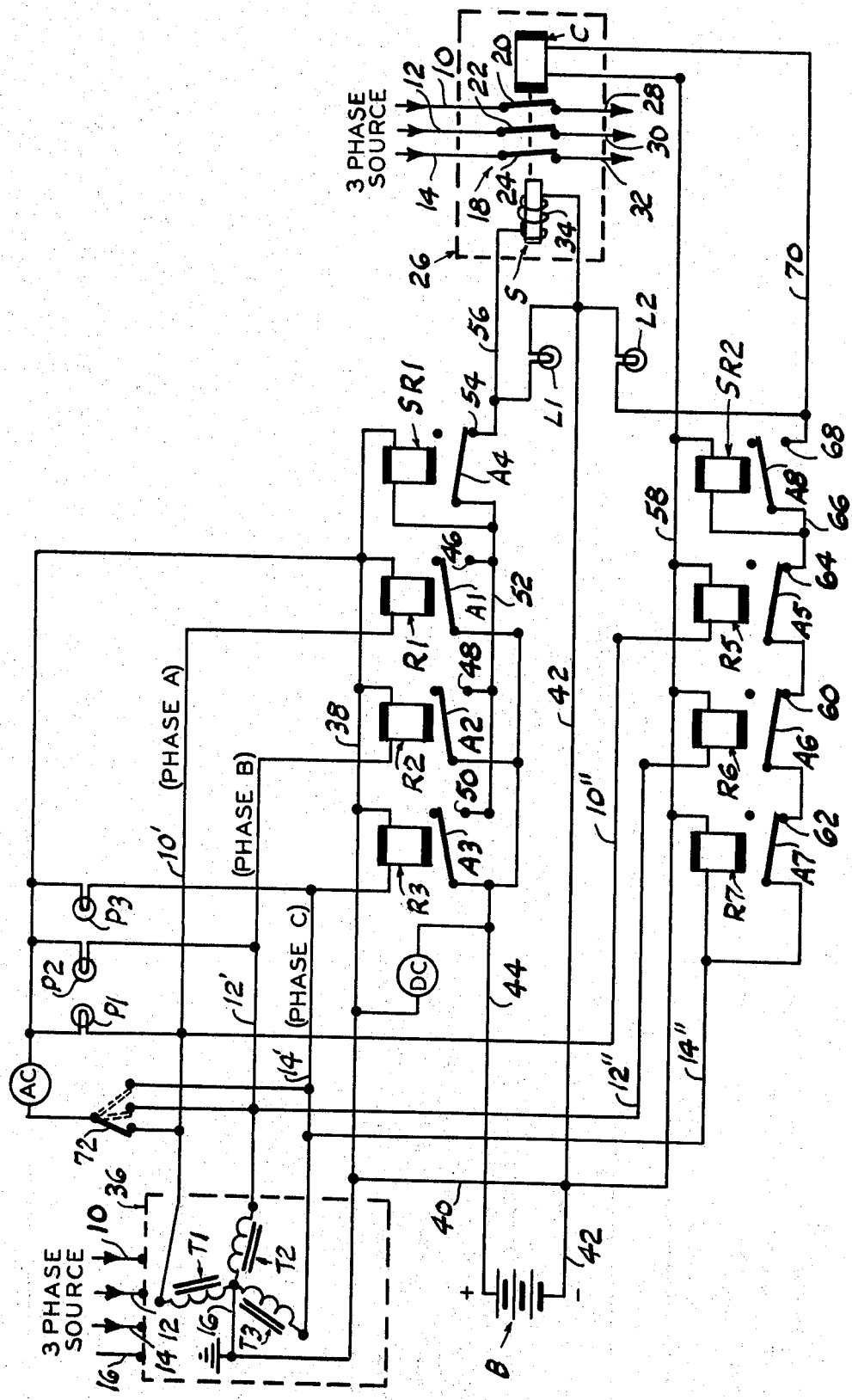

POLYPHASE CIRCUIT CONTROL SYSTEM

BACKGROUND OF THE INVENTION

1. Field of the Invention

The present invention relates to polyphase circuit fault detection and more particularly to a control circuit interposed between a polyphase current source and a polyphase distribution system for interrupting current to the distribution system when any one or more phases of the polyphase source is dropped and then restoring current to the distribution system when the polyphase circuit fault has been corrected.

Many small electric utility companies or municipalities purchase their electric power on a wholesale basis from a large electric utility generating station or company and operate their own distribution system. One of the principal problems with such an arrangement is that occasionally the electric current supplier loses or drops one or two phases of current on their transmission lines. This results in a drop in voltage through the distribution lines which is damaging to electrically operated machines.

It is, therefore, desirable to interpose a control circuit between the polyphase supply transmission lines and the distribution lines of the small utility company.

2. Description of the Prior Art

Most of the prior art patents relating to polyphase circuit fault detection and interruption are directed primarily to a circuit control for interrupting current to an electric motor, or the like.

U.S. Pat. No. 3,056,067 discloses a polyphase motor protecting circuit breaking system in which current to the motor is interrupted by a fault of any one phase of the supply with current thereafter applied to the motor when the polyphase source fault is corrected.

The principal distinction of this invention over the above numbered patent is the provision of a separate source of direct current potential in combination with the polyphase current source for opening breaker switch elements and interrupting current to a distribution system thereby insuring that this circuit breaking function is independent of the polyphase current source.

SUMMARY OF THE INVENTION

A plurality of relays are respectively connected with a polyphase current supply. A source of direct current is connected with the contacts of a first bank of three relays. A first slave time delay relay, energized by the de-energization of one of the first three relays, applies current from the direct current potential to a solenoid in turn opening circuit breaker switch elements interposed between the polyphase current source and polyphase distribution lines. A second bank of three relays energize a second slave time delay relay connected with the polyphase source through the contacts of the second bank of three relays for energizing a reset coil closing the circuit breaker switch elements in response to restoration of all phases in the polyphase source following a predetermined time lapse.

The principal object of this invention is to provide a polyphase circuit control which will open normally closed circuit breaker switch elements in response to a fault in the polyphase current supply and maintain the switch elements open until the fault has been corrected and then automatically close the switch elements.

BRIEF DESCRIPTION OF THE DRAWING

The single FIGURE is a wiring diagram.

DESCRIPTION OF THE PREFERRED EMBODIMENT

Like characters of reference designate like parts in those figures of the drawings in which they occur.

In the drawings:

The reference numerals 10, 12 and 14, respectively, indicate the three phase wires (A, B and C) of a polyphase current source including a fourth or neutral wire 16. The three source wires 10, 12 and 14 are connected with a circuit breaker 18 comprising ganged switch elements 20, 22 and 24 respectively contained by an oil circuit recloser, indicated generally at 26, commonly referred to and hereinafter called OCR. The numerals 28, 30 and 32, respectively, indicate the three phase wires of a utility distribution system respectively connected with the circuit breaker switch elements. The OCR 26 is conventional and its normal function is to open its circuit breaker when a fault occurs in one or more of the distribution lines. The OCR 26 is also provided with a solenoid S having a coil 34 for opening the circuit breaker 18 when a fault occurs in any one or more of the source wires 10, 12 and 14 in the manner presently explained.

The OCR 26 is also provided with a reset coil C arranged to close the switch elements of the circuit breaker 18 in the manner hereinafter explained.

The source wires 10, 12 and 14 and the neutral wire 16 are connected with a transformer unit 36 including a Y arrangement of three transformers T1, T2 and T3 respectively connected with the source wires 10, 12 and 14 and the neutral wire 16. The output of the respective transformers is connected with phase control conductors 10', 12' and 14' in turn respectively connected to one end of the respective coil of a first bank of three, normally energized, alternating current operated relays R1, R2 and R3 having open contacts when energized with the other end of the coil of each of these three relays grounded by a conductor 38 connected to the neutral wire 16. This ground wire 38 is connected, by a wire 40, to the negative terminal wire 42 of a positive direct current source, such as a 48 volt battery B. The battery negative wire 42 is connected to one end of the coil 34 of the solenoid S.

The positive terminal battery wire 44 is connected in series to the armatures A1, A2 and A3 of the respective first bank of relays R1, R2 and R3. These three relays have contacts 46, 48 and 50, respectively, connected in series, by a wire 52, with the armature A4 of a first direct current operated time delay slave relay SR1. One end of the coil of the slave relay SR1 is connected to the wire 52 with the other end of its coil connected with the ground wire 38. The slave relay SR1 is normally de-energized and its armature A4 is normally closed with its contact 54. This relay SR1 is adjusted to break its armature from the contact 54 following a predetermined time lapse after its coil is energized for the reasons presently explained. Relay SR1 contact 54 is connected with the other end of the coil 34 of the solenoid S by a wire 56.

The phase control conductors 10', 12' and 14' are respectively connected to one end of the respective coil of a second bank of three normally energized alternating current operated time delay relays R5, R6 and R7 having contacts which close following a predetermined time delay after their respective coils are energized by other conductors 10'', 12'' and 14'' with the other end of the coils of these relays R5, R6 and R7 connected to a wire 58 connected at one end with the juncture of the ground wires 40 and 42 and connected at its other end to one end of the reset coil C. The armature A5 of relay R5 is connected to the contact 60 of relay R6. The armature A6 of relay R6 is connected to the contact 62 of relay R7. Relay R7 armature A7 is connected to the C phase control conductor 14''. The armature A8 of a second alternating current operated time delay slave relay SR2 is connected with the contact 64 of relay R5 by a wire 66. The wire 66 is connected to one end of the coil of the second slave relay SR2 with the other end of the coil of this relay connected to the ground wire 58. Contact 68 of slave relay SR2 is connected with the other end of the reset coil C by a wire 70.

The relays R1, R2 and R3 are 120VAC type CO-1 relays. Relay SR1 is 48VCD type 950 time delay relay. The relays R5, R6, R7 and SR2 are 120VAC type 950 time delay relays. All of the above relays are conventional and may be obtained from the Square D Company having retail outlet stores in most major cities.

A lamp L1, connected between the wires 56 and 42, indicates when the solenoid S is energized. Similarly a lamp L2, connected between the wires 70 and 42, indicates when the reset coil C is energized. Phase indicating lamps P1, P2 and P3 are respectively connected between the phase control conductors 10', 12' and 14' and ground to indicate when the respective phase current is present.

An alternating current volt meter AC is connected to ground and the switch element of a selector switch 72 selectively making with its three contacts in turn connected with the respective phase control conductors 10', 12' and 14'.

A direct current volt meter DC is connected between the positive battery wire 44 and ground wire 38. The battery B is normally maintained at full potential by a battery charger, not shown.

OPERATION

In normal operation the circuit breaker switch elements remain closed and the phase current source is applied to the distribution lines 28, 30 and 32. Current on the phase control conductors 10', 12' and 14' is at full voltage and maintain relays R1, R2 and R3 energized with their respective armatures disconnected from their respective contacts. The first slave relay SR1 remains de-energized with its armature A4 closed with its contact 54 and the solenoid S remains de-energized. The relays R5, R6 and R7 are respectively energized from the phase control conductors 10'', 12'' and 14'' and their respective armatures are closed with their respective contacts so that the second slave relay SR2 remains energized and its armature normally open with respect to its contact 68. In the event of the loss of at least one phase resulting in a drop in voltage to 80 volts or less from the three phase current source wires, for example, phase A wire 10, the respective associated relay R1 will be de-energized so that when its armature A1 makes with its contact 46 the normally open direct current circuit is completed from the battery B to the solenoid S which, when energized, opens the switch elements 20, 22 and 24 of the circuit breaker 18 thus interrupting current to the distribution lines 28, 30 and 32. Relay R1 armature A1 closing with its contact 46 simultaneously energizes the first slave relay SR1 which after a predetermined time lapse permits its armature A4 to break from its contact 54 thus de-energizing the coil of the solenoid S so that the reset coil C may be operated to reclose the breaker switch 18 as hereinafter explained. Simultaneously with the above phase failure the relay R5 becomes de-energized thus opening its armature A5 from its contact 64 thus de-energizing the second slave relay SR2. When the phase failure has been corrected and current restored to all three phases the previously de-energized relay R1 is again energized opening its armature A1 from its contact 46 and simultaneously energizing relay R5 which, after a predetermined time lapse, closes its armature A5 with its contact 64 thus energizing the second slave relay SR2 making its armature R8 with its contact 68 and completing a circuit over the wires 70 and 58 to the reset coil C. Since the breaker contacts of the second bank of three relays R5, R6 and R7 are connected in series with the coil of the second slave relay SR2 all phases of the polyphase source must be at full voltage before the second slave relay SR2 will be energized. The reset coil C, when energized, closes the switch elements 20, 22 and 24 of the circuit breaker 18 so that current is restored to the distribution lines 28, 30 and 32. After a predetermined time lapse, sufficient to allow the reset coil C to close the breaker switch 18, the second slave relay SR2 breaks its armature A8 from its contact 68 so that the reset coil C is de-energized and the control circuit is again in normal operating condition.

Obviously the invention is susceptible to changes or alterations without defeating its practicability, therefore, I do not wish to be confined to the preferred embodiment shown in the drawings and described herein.

I claim:

1. In a polyphase current distribution control system including a plurality of phase line source and distribution conductors, a neutral line conductor, a polyphase circuit breaker having respective normally closed switch elements interposed between respective phase line source conductors and distribution line conductors, the improvement comprising:

a solenoid operable to simultaneously open said respective switch elements;

a reset coil operable to simultaneously close said respective switch elements;

a normally open control circuit connecting a source of direct current with said solenoid;

a plurality of relays respectively associated with respective phase line conductors;

relay circuit means connected to energize said plurality of relays from the voltage between said respective phase line conductors and said neutral line conductor;

a first slave relay having normally closed contacts connected in series in said solenoid control circuit; and, a second slave relay having normally open contacts connecting said reset coil with at least one phase of said phase line source of electrical energy, whereby a phase failure in said phase line source de-energizes at least one relay of said plurality of relays and closes said normally open control circuit for energizing said solenoid and opening said normally closed switch elements and whereby correction of said phase failure energizes said second slave relay and said reset coil for reclosing said normally closed switch elements.

2. The combination according to claim 1 in which said plurality of relays includes:

a first bank of relays each having a pair of normally open contacts with one contact of each pair respectively connected in series in said normally open control circuit.

3. The combination according to claim 2 in which said first slave relay is a time delay relay having one end of its coil connected to ground and having the other end of its coil connected with one series of the series connected contacts of said first bank of relays for energizing said first slave relay and opening its normally closed contacts after a predetermined time delay.

4. The combination according to claim 3 in which said plurality of relays further includes:

a second bank of relays each having a pair of normally closed contacts respectively connected in series with one end of the coil of said reset coil.

5. The combination according to claim 4 in which said second slave relay is a time delay relay having one end of its coil connected to ground and having the other end of its coil connected with the series connected normally closed contacts of said second bank of relays for energizing said second slave relay and closing its normally open contacts for a predetermined period of time.

* * * * *

UNITED STATES PATENT OFFICE
CERTIFICATE OF CORRECTION

PATENT NO. : 3,868,551
DATED : February 25, 1975
INVENTOR(S) : Wilburn W. Spray

It is certified that error appears in the above-identified patent and that said Letters Patent are hereby corrected as shown below:

Page 1, Item 76, inventor's name should read :

Wilburn W. Spray

Signed and Sealed this twenty-second Day of July 1975

[SEAL]

Attest:

RUTH C. MASON
Attesting Officer

C. MARSHALL DANN
Commissioner of Patents and Trademarks